United States Patent
Douglas et al.

[19]

[11] Patent Number: 5,988,154
[45] Date of Patent: Nov. 23, 1999

[54] COMBINATION STEAMER AND CONVECTION OVEN WITH DOUBLE DOORS

[75] Inventors: Scott Douglas, Burlington; Jonathon Haas, Colchester; Charles Kingdon, Vergennes, all of Vt.

[73] Assignee: G.S. Blodgett Corporation, Burlington, Vt.

[21] Appl. No.: 08/961,986

[22] Filed: Oct. 31, 1997

[51] Int. Cl.⁶ .................................................. A21B 1/08
[52] U.S. Cl. .................. 126/20.1; 126/20; 292/DIG. 30; 292/DIG. 49; 292/DIG. 69
[58] Field of Search .................... 126/20, 273 R, 126/20.1, 19 R; 292/304, 224, DIG. 69, DIG. 30, DIG. 49; 49/503, 394

[56] References Cited

U.S. PATENT DOCUMENTS

| | | |
|---|---|---|
| 751,450 | 2/1904 | Beck . |
| 3,409,003 | 11/1968 | Rehberg et al. . |
| 4,163,344 | 8/1979 | Scherer . |
| 4,506,598 | 3/1985 | Meister . |
| 4,641,630 | 2/1987 | Meister . |
| 4,655,192 | 4/1987 | Jovanovic . |
| 4,698,487 | 10/1987 | Meister . |
| 4,699,119 | 10/1987 | Benko et al. . |
| 4,700,685 | 10/1987 | Miller . |
| 4,742,847 | 5/1988 | Meister . |
| 5,618,458 | 4/1997 | Thomas . |
| 5,619,983 | 4/1997 | Smith . |

*Primary Examiner*—Carl D. Price
*Attorney, Agent, or Firm*—Donald C. Casey, Esq.

[57] ABSTRACT

An improvement for a combination steamer and convection oven is described. The improvement includes double access doors in the front of the oven for controlling access to the cooking cavity within. The doors are cam actuated between a closed position, a first open position wherein the doors are cracked to release hot gases from within the cavity and a second open position wherein the doors are fully open. The admission of steam to the cavity is controlled by a positive displacement flapper valve and one or a pair of the ovens can be used, and if a pair is used a single steamer provides steam for either or both cooking cavities.

12 Claims, 4 Drawing Sheets

COMBINATION STEAMER AND CONVECTION OVEN WITH DOUBLE DOORS

FIELD OF THE INVENTION

This invention relates to a combination steamer and convection oven which has a unique double door arrangement so that it can be used in commercial establishments while maximizing the aisle space available. The oven can be a single cavity or a stacked double cavity and can be dimensioned small enough to pass through the hatch in a maritime vessel or other confined door ways.

DESCRIPTION OF THE PRIOR ART

Combination convection and steamer ovens have been known for many years and are in commercial utilization primarily. An example is described in U.S. Pat. No. 4,506,598, and related U.S. Pat. Nos. 4,641,630; 4,698,487; and 4,742,847 the disclosures which are hereby incorporated by reference.

In the device of the above patents there is described two modes of operation. In a first operating phase, useful for thawing, heating, cooking and steaming food products, a separate boiler is energized and the necessary amount of steam admitted to the heating cavity where the heat of condensation of the steam is discharged onto contents of the cooking space. The condensed water and juices are then drained from the cooking, cavity.

In a second operating phase for roasting or baking food a heating apparatus is switched on and heating elements which surround a fan heat air which is then circulated into the heating cavity. The food stuffs are then cooked in a conventional fashion by convection, and juices are drained through the same conduit drain used in the steam phase.

The fan is a blower wheel provided which is used to both circulate steam and to circulate hot air. The steam generator described provides steam at atmospheric pressure and a temperature regulator with a control vent is provided so that excessive amounts of steam will not be generated and vented into the kitchen atmosphere. As will be obvious to those skilled in the art it is essential that loss of residual steam be minimized both from an economic standpoint and in order to control operator working conditions.

In commercially available combination steamer and convection ovens such as those described, for example, in U.S. Pat. Nos. 4,655,192; 4,700,685; and 5,619,983, the cooking cavity is accessed through a single door in the front of the device, and when the door is opened, caution must be exercised to avoid discharging residual steam into the operator's face. In a commercial kitchen environment aisle space may be at a premium, and it may be awkward for an operator to open an oven while standing far enough away to avoid the escaping steam. Conventional ovens with double front doors are shown, for example, in U.S. Pat. Nos. 4,699,119; 3,409,003; and 5,618,458. These double door designs require a seal in the form of a basket around the door so that residual heat will not be leaked into the cooking area. Such designs for steamers are not present in the prior art due to the need for a better seal than in a conventional oven.

Double doors also should be controlled swinging between the closed and open positions. In U.S. Pat. No. 3,409,003 double doors are provided but they are free swinging and not controlled. Similar problems are presented with U.S. Pat. Nos. 4,699,119 and 5,618,458.

A cam mechanism is shown in U.S. Pat. No. 4,163,344, but that cam mechanism requires a spring located within the oven cavity which would be subject to corrosion and cleaning problems.

According, there is a need for a cabinet design for a combination steamer and convection oven wherein the oven cavity can be accessed safely by an operator and wherein the doors are controllable so that they will not be free swinging.

SUMMARY OF THE INVENTION

It has been discovered that a cabinet for a combination steamer and convection oven can be designed wherein double doors are provided on the front face and wherein the doors are controlled by a double pivot single latch door mechanism as compared to the conventional single pivot single latch arrangement.

It has further been discovered that the unique oven design of this invention can be stacked to provide two oven cavities and a single steam generator can be used with the valve design of this invention to efficiently provide atmospheric steam at either or both cooking cavities.

Accordingly it is an object of this invention to provide a cabinet design for a combination steamer and convection oven wherein double doors are provided for accessing the cooking cavity, in the front wall of the oven.

It is another object of this invention to provide a controlled double door arrangement for accessing a combination steamer and convection oven wherein a double pivot single latch is provided with a gasket between the doors so that the doors can be cracked open to allow the steam in the oven to escape and then opened fully.

It is a further object of this invention to provide a stacked pair of ovens so that a single steam generator and valve arrangement can be used to supply steam efficiently to either or both of the oven cavities as required wherein the valve has a low pressure drop and does not require positive back pressure to work.

It is yet another object of this invention to provide a unique functional cabinet design for commercial application for a pair of combination steamer and convection ovens which are stackable and can be readily accessed by an operator by opening double doors using a cam and pivot arrangement wherein the doors open initially a crack to release steam from within the oven and then through a cam follower arrangement open fully for removal of cooked food from within the cavity.

These and other objects will become readily apparent with reference to drawings and following description wherein:

DETAILED DESCRIPTION OF THE INVENTION

Figures 1, 2:
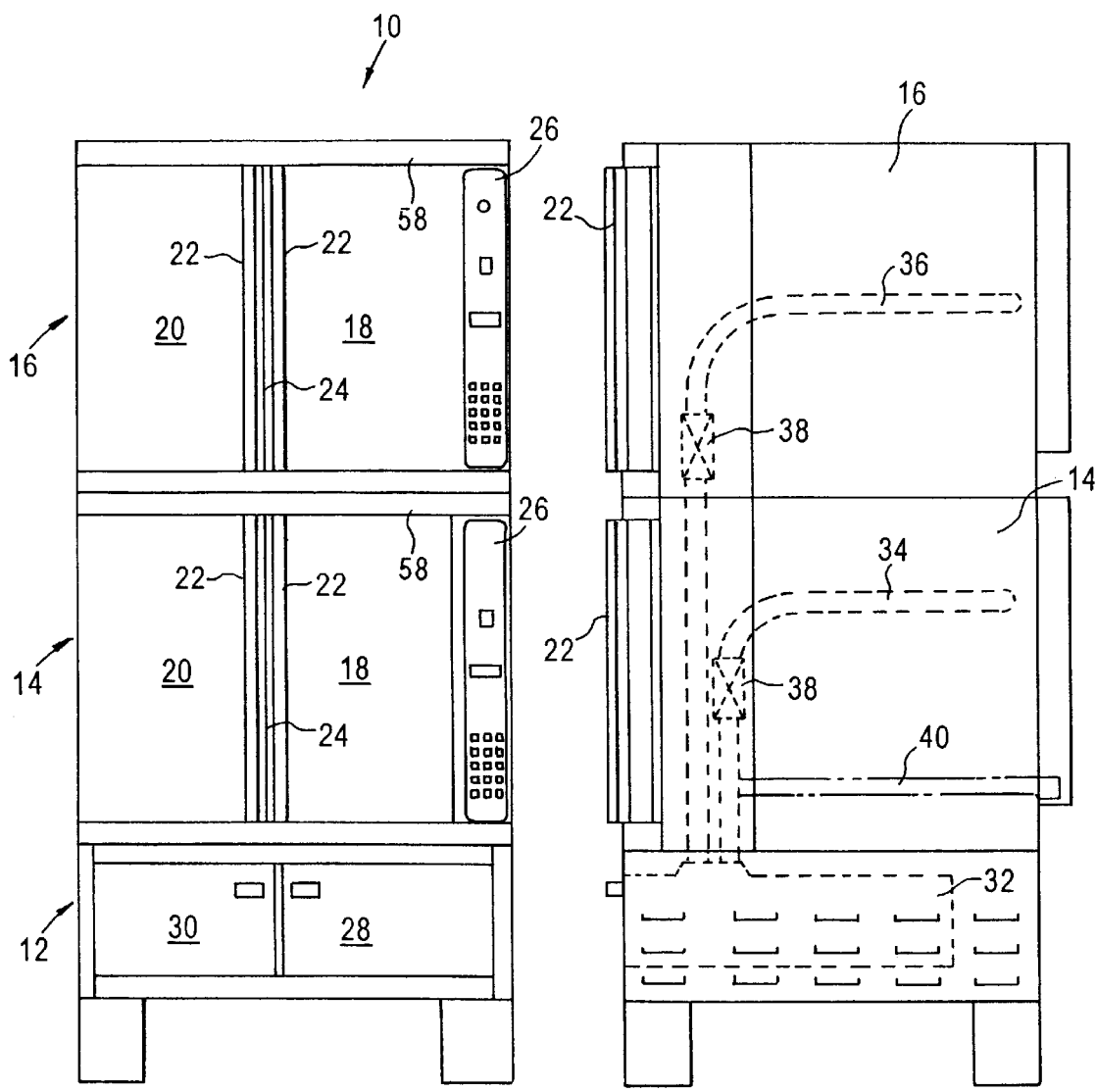
FIG. 1 is a front view of a stacked embodiment of the combination steamer oven of this invention.
FIG. 2 is a side view of the embodiment of FIG. 1 showing the steam delivery system in phantom.

With attention to the drawings and to the FIGS. 1 and 2 in particular, the oven of this invention 10 consists of a base 12 which houses a conventional boiler and lower and upper stacked cavities 14 and 16. The invention need not include two stacked cooking cavities as shown but could consists of only a single cavity 14 on the base 12. In most commercial establishments, however, the units will be stacked as shown in FIGS. 1 and 2. Each cavity 14 and 16 has a right door 18 and a left door 20. The doors are controlled by vertical handles 22. The doors as will be subsequently explained seal at their joining surface 24 and open outwardly. A control panel 26 is provided and the base 12 also has front opening doors 28 and 30. The base 12 houses a boiler 32 and other conventional components subject to repair so that repairs can be affected by opening doors 28 and 30 in base 12 for access to the interior of base 12. As shown in FIG. 2, the boiler 32 is part of a steam system which includes a conduit 34 opening into the lower cavity 14 and a conduit 36 feeding steam to the upper cavity 16. Conduits 34 and 36 are controlled by valves 38. A over pressure outlet 40 is shown schematically in cavity 14. Over pressure outlet 40 is provided so that if pressure in the boiler 32 builds beyond a safety level the steam will be vented to the outside through the bypass 40.

As will be obvious to those skilled in the art the ovens 14 and 16 of this invention are an improvement to the ovens shown in U.S. Pat. Nos. 4,506,598; 4,641,630; 4,698,487; and 4,742,847 and may include components shown therein such as means for circulating heated convention air, a separate resistance heater, and a conventional drainage system so that when the steam generated condenses it will drain from the cavities 14 and 16. The oven of this invention 10 then is intended to include conventional components found in the above identified U.S. Patents which are incorporated herein by reference with the modifications shown and described herein.

Figure 3:
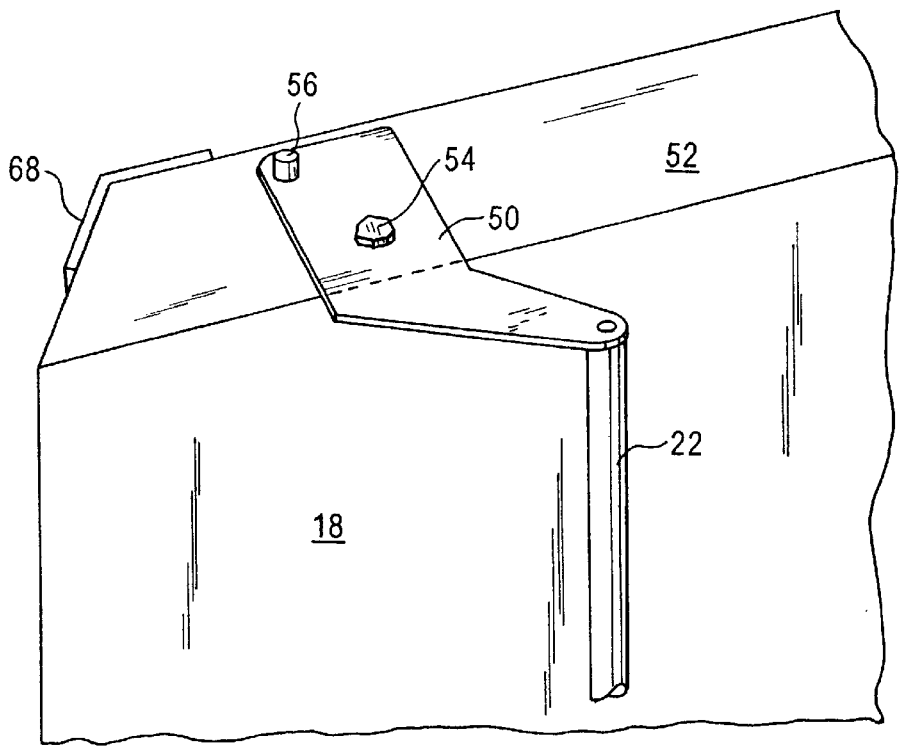
FIG. 3 is a fragmentary view of the right door handle and cam bracket.
Figure 4:
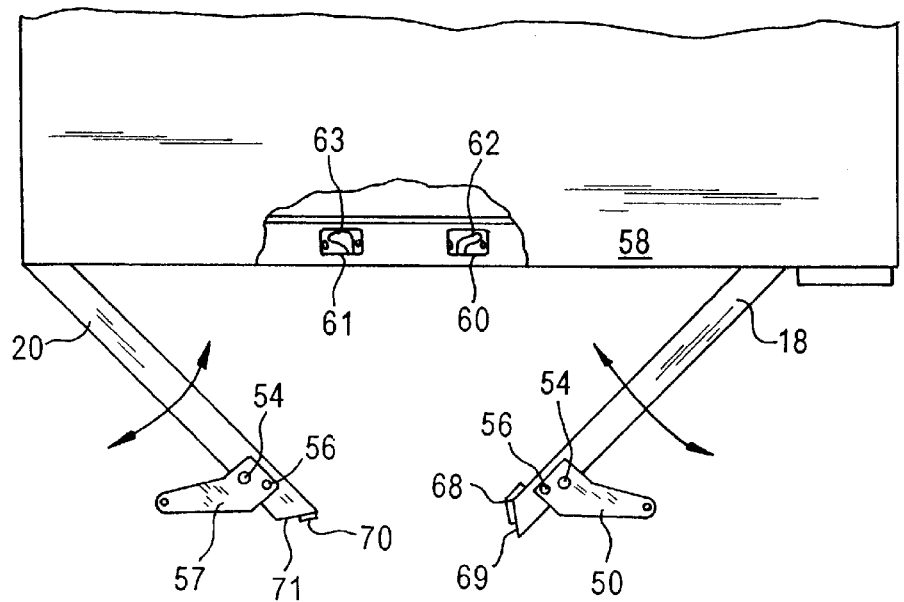
FIG. 4 is a fragmentary top view of the doors including cam brackets and having a portion of the top removed to illustrate the cam latch plates.

With attention to the doors and to FIG. 3 and 4, the right hand door 18 as described above is controlled by a vertical handle 22. Handle 22 is mounted on the door by a cam bracket 50 mounted to the upper surface of the door 52 by a pivot connection 54. A vertical pin 56 extends upwardly from bracket 50 to function as the cam follower as will be subsequently described.

Similarly, the left hand door 20 mounts a cam bracket 51 which in turn mounts a pin 56 about a pivot connection 54.

The roof portion 58 of each oven cavity 14 and 16 mounts cam latches 60 and 61 which in turn provides a cam surface 62 and 63 for cam pin 56. Surfaces 62 and 63 are mirror images of each other.

Figure 5:
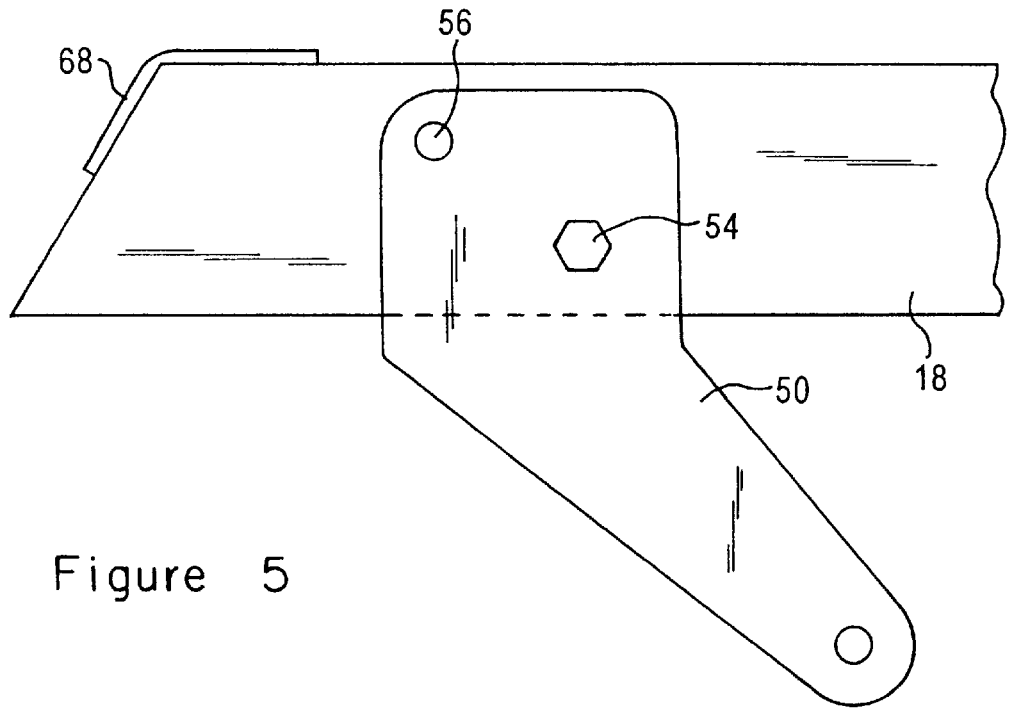
FIG. 5 is a top view of the right side door and cam bracket similar to FIG. 3.
Figure 6:
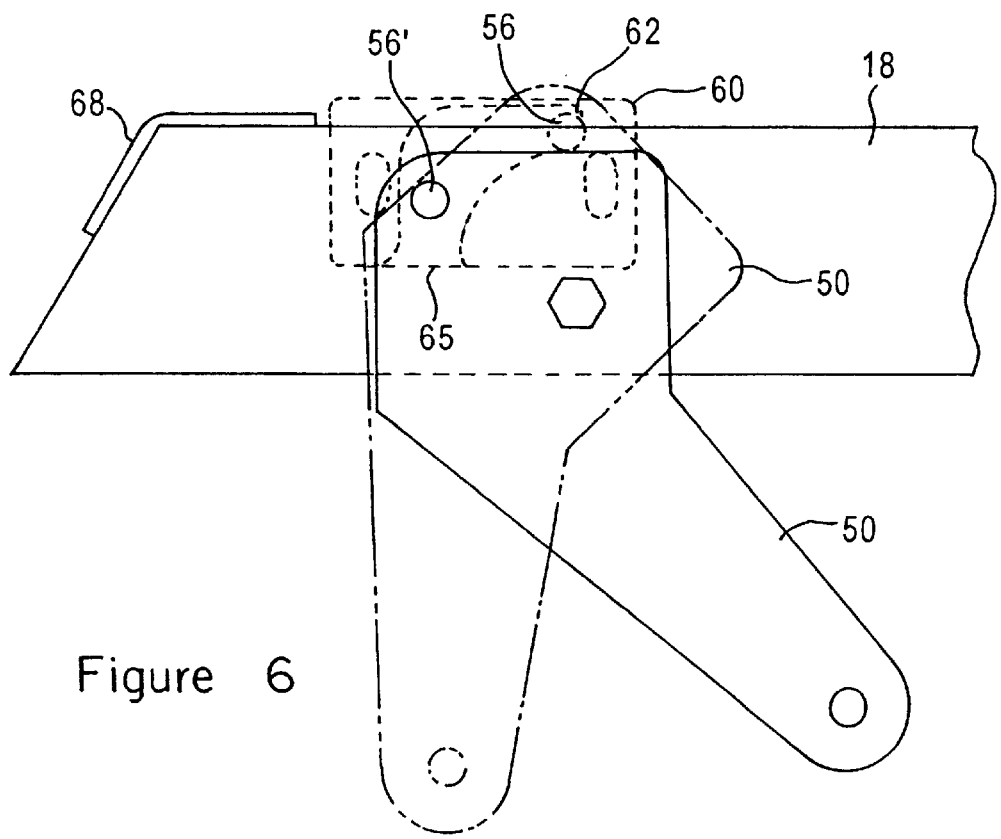
FIG. 6 is a view similar to FIG. 5 with the cam latch plate superimposed showing the open and closed positions in phantom.

With attention to FIGS. 5 and 6, there is depicted, the right hand door 18, but as will be obvious to those skilled in the art the left hand door functions in the same fashion.

With attention to FIG. 6, the cam bracket 50 shown in phantom is in the closed position wherein the pin 56 has traveled along the cam surface path 62 of cam latch 60 to the right extremity. In that position the door is locked closed. When the door is opened the latch member 50 will be rotated counterclockwise causing pin 56 to travel along pathway 62 until it reaches the position shown and identified as 56'. In that position the door will be "cracked" so that steam or heated air within the oven cavity can be released, but the door will not be fully opened. When the pin then travels further along pathway 62 to exit the latch at the exit point 65, the door will be free and will be swung opened to a fully opened position. The door then has two positions, a first position wherein it is merely cracked open to permit the exit of heated gases from within the oven cavity and the second position wherein it is fully opened for access to the oven cavity to remove food items that have been cooked or to load food items to be cooked. This is a safety feature to avoid burning the operator with hot gases from the interior of the oven. When the handles are initially rotated to separate oven doors 18 and 20 they are held in position be the action of follower pin 56 in cam slot 62. A further action by the operator is required to pull the doors outwardly whereby pin 56 exits the cam slot 62 at outlet 65 thereby freeing the doors into an open position.

With reference to FIG. 4, when the doors 18 and 20 are in the sealed position gaskets 68 and 70 abut to seal the doors. The gaskets preferably are conventional silicone rubber and obviously are compatible with the heat and moisture conditions typical in a combination steamer oven of this invention. The mating surface 24 where gaskets 68 and 70 seal the doors consists of approved surfaces 69 and 71 which form supplementary angles with the doors 18 and 20 to facilitate the seal.

Figure 7:
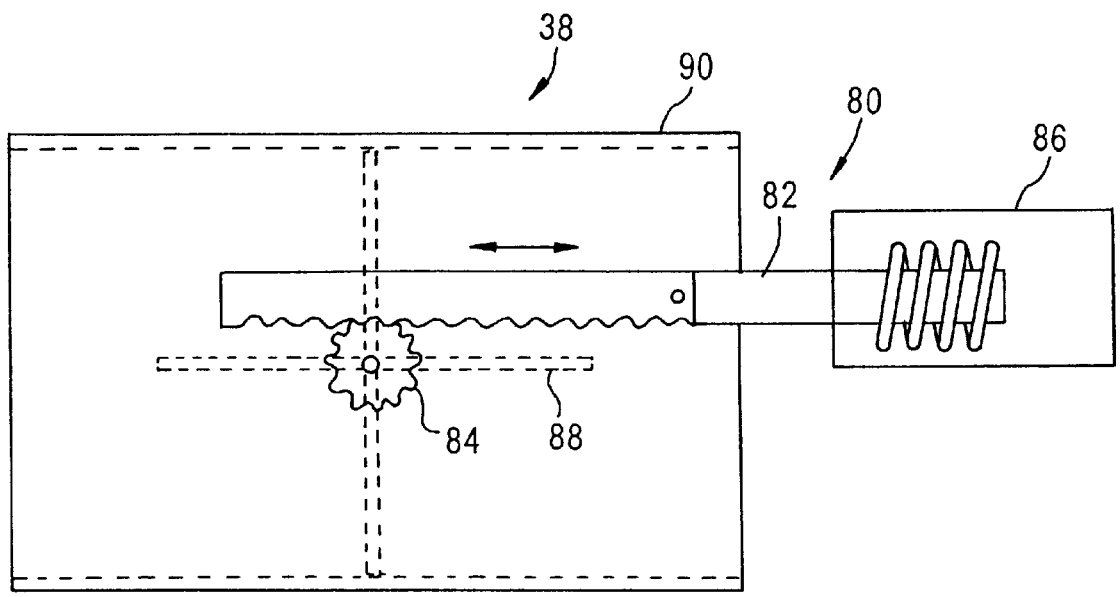
FIG. 7 is a fragmentary front schematic view of the steam valve and actuator.
Figure 8:
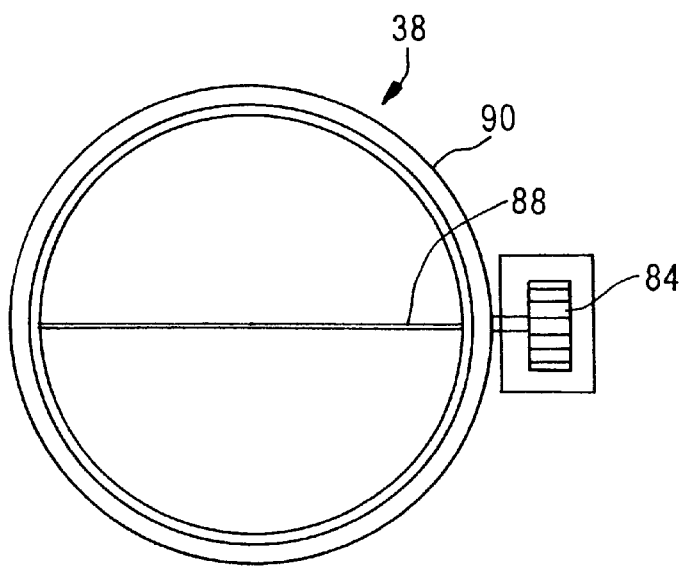
FIG. 8 is an end view of the valve of FIG. 7.

With reference to FIGS. 7 and 8, the steam valve used in the instant invention identified as reference number 38 in FIG. 2 is specifically designed to control steam in the absence of a positive pressure. As will be obvious to those skilled in the art most steam valves require a positive back pressure to operate. In the instant valve, however, a linear actuator 80 is provided which is, in fact, a rack 82 operating on a pinion 84 which in turn is controlled by a solenoid 86. The rack and pinion actuator 80 operates a flapper 88 in the conduit 90 which controls the passage of steam from the boiler to the internal cavity 14 or 16. The valve by its design also has a very small pressure drop. When a signal is sent to the solenoid 86 the voltage is applied to the solenoid and the valve flapper is opened or closed. Typically, when the solenoid is activated it will rotate the flapper into a closed position and when power is removed from the solenoid a spring (not shown) will operate to return the flapper to the open position.

In summary, the instant invention has an improved combination convection oven and steamer wherein access to the oven cavity is supplied through front opening doors which have a double pivot single latch. The device of this invention then can be readily accessed by an operator merely by rotating the handles to a first position wherein the doors are opened slightly to permit the outflow of heated gases from within the oven cavity. The operators then can further activate the cam mechanism by pulling the doors to a fully opened position. The double action required then is a safety device for the operator to avoid the inadvertent opening of the doors to a fully opened position expelling the heated gases directly onto the operator. The invention further includes a steam valve which operates without position back pressure and which provides a very small pressure drop so that the steam is efficiently dispensed within the oven cavity by the steam generator.

It will be readily seen by one of ordinary skill in the art that the present invention fulfills all of the objects set forth above. After reading the foregoing specification, one of ordinary skill will be able to effect various changes, substitutions or equivalents and various other aspects of the invention as broadly disclosed herein. It is therefore intended that the protection granted hereon be limited only by the definition contained in the appended claims and equivalents thereof.

We claim:

1. In a combination steamer convection oven the improvement comprising:

at least one cabinet enclosing a cooking cavity having a front wall with an access opening to said cavity; side walls, a roof and a base and means to generate and convect steam through said cavity within said cabinet;

a pair of doors mounted on the front wall across the opening, said doors, in a closed position, being contained in a vertical plane containing said front wall and sealing said opening, said doors having mating vertical edge surfaces that define supplementary angles in the closed position;

handle means connecting said doors and said cabinet for rotating said doors outwardly from a closed position to a first open position, and from the first to a second open position, said first position unsealing but restricting access to the cavity through the opening, and the second position providing unrestricted access to the cavity through the opening; said means including a handle rotatably mounted on each of said doors.

2. The oven of claim 1 further comprising gasket means mounted on said mating edge surfaces of said doors, said surfaces being deposited at acute angles to the vertical plane.

3. The oven of claim 1 wherein said handle means comprises cam surfaces defined on the roof portion of said cabinet adjacent each door and a corresponding cam follower therefor mounted on each door.

4. The oven of claim 3 further comprising a cam bracket rotatably coupled between each handle and a respective door, said bracket mounting said cam follower.

5. The oven of claim 3 wherein when the doors are in the closed position and in the first open position said followers engage the cam surfaces and in the second open position said followers do not engage the cam surfaces.

6. The oven of claim 5 wherein a latch plate contains the cam surface for each door and each plate is mounted on said cabinet adjacent the roof, each latch defining a follower receiving slot having an opened end adjacent the front of said roof and a closed end.

7. The oven of claim 1 wherein said base includes boiler means for generating steam and said cabinet includes means for conveying steam from said boiler to said cooking cavity and valve means coupled to said conveying means for controlling the passage of steam into said cavity.

8. The oven of claim 7 wherein said valve means is a positive displacement flapper valve.

9. The oven of claim 8 wherein said valve is solenoid operated.

10. The oven of claim 1 wherein first and second cabinets are provided and the roof of the first supports the base of the second.

11. The oven of claim 10 further comprising a single boiler means mounted in the base of the first cabinet and means for conveying steam therefrom selectively to the first and second cabinet cooking cavities.

12. The oven of claim 11 wherein the selective conveying means includes positive displacement flapper valve means separately controlling passage of steam to the first and second cooking cavities.

* * * * *